United States Patent
Linhart et al.

(10) Patent No.: US 8,029,586 B2
(45) Date of Patent: Oct. 4, 2011

(54) FILTER PIPELINE

(75) Inventors: Jochen Linhart, Schwaikheim (DE); Sascha Bauer, Auenwald (DE); Michael Fasold, Auenwald (DE)

(73) Assignee: Mann+Hummel GmbH, Ludwigsburg (DE)

( * ) Notice: Subject to any disclaimer, the term of this patent is extended or adjusted under 35 U.S.C. 154(b) by 296 days.

(21) Appl. No.: 12/280,555

(22) PCT Filed: Feb. 14, 2007

(86) PCT No.: PCT/EP2007/051422
§ 371 (c)(1),
(2), (4) Date: Aug. 24, 2008

(87) PCT Pub. No.: WO2007/096280
PCT Pub. Date: Aug. 30, 2007

(65) Prior Publication Data
US 2009/0031681 A1 Feb. 5, 2009

(30) Foreign Application Priority Data
Feb. 24, 2006 (DE) .................... 20 2006 003 137 U

(51) Int. Cl.
*B01D 46/52* (2006.01)
(52) U.S. Cl. ............. 55/385.3; 55/378; 55/379; 55/503; 55/509; 55/521; 55/529; 123/198 E
(58) Field of Classification Search ................ 55/385.3, 55/300, 361, 378, 379, 363, 366, 497, 503, 55/509, 521, 529; 95/273; 123/198 E; 210/448, 210/152, 497.3
See application file for complete search history.

(56) References Cited

U.S. PATENT DOCUMENTS

| | | | |
|---|---|---|---|
| 2,562,331 A | 7/1951 | Howard | |
| 2,761,529 A * | 9/1956 | Wisenbaugh | 303/31 |
| 3,713,440 A * | 1/1973 | Nicholes | 128/205.12 |
| 5,352,256 A | 10/1994 | Stead | |
| 5,368,728 A | 11/1994 | Reaves | |
| 5,655,526 A | 8/1997 | Gibertoni | |
| 5,902,365 A | 5/1999 | Haggard | |
| 6,024,066 A | 2/2000 | Nakayama | |
| 6,638,330 B1 * | 10/2003 | Bergami | 55/315.1 |
| 6,808,552 B2 * | 10/2004 | Borla | 95/273 |
| 7,208,025 B2 * | 4/2007 | Pikesh | 55/385.3 |
| 2002/0046654 A1 | 4/2002 | Bloomer | |
| 2003/0029144 A1 * | 2/2003 | Bergami | 55/319 |
| 2004/0262076 A1 | 12/2004 | Wolf | |
| 2008/0060327 A1 * | 3/2008 | Scagliarini | 55/385.3 |
| 2008/0289305 A1 * | 11/2008 | Girondi | 55/385.3 |

FOREIGN PATENT DOCUMENTS

CH 169328 5/1934
(Continued)

OTHER PUBLICATIONS

German patent office search report for 20 2006 003 137.5.

*Primary Examiner* — Duane Smith
*Assistant Examiner* — Minh-Chau Pham
(74) *Attorney, Agent, or Firm* — James Hasselbeck

(57) ABSTRACT

A filter pipeline for an air intake system of an internal combustion engine has a tubular body and a filter element arranged in the tubular body. The filter element is a filter bag of a flexible material that has an opening and is attachable in the area of the opening to the tubular body. The filter bag and an inner wall of the tubular body are shaped such that in a circumferential direction of the pipeline different spacings are provided between the filter bag and the inner wall of the tubular body.

24 Claims, 3 Drawing Sheets

FOREIGN PATENT DOCUMENTS

| | | |
|---|---|---|
| DE | 8136347 | 4/1984 |
| DE | 9116895 | 8/1994 |
| EP | 0744985 | 12/1996 |
| GB | 456468 | 11/1936 |
| JP | 2001082267 | 3/2001 |
| JP | 2006312895 | 11/2006 |

* cited by examiner

FILTER PIPELINE

BACKGROUND OF THE INVENTION

The invention concerns a filter pipeline, in particular for the air intake system of an internal combustion engine, comprising a tubular body in which at least one filter element is received.

Filter pipelines are utilized in the air intake system of internal combustion engines in order to guide the taken-in ambient air through a filter element and in order to supply in this way filtered combustion air to the engine. In known filter pipelines at least two tubular bodies are provided between which a filter housing for receiving a filter element is arranged. By means of the tubular body for the raw air the ambient air is supplied to the filter housing and, after passing the filter element, the ambient air is supplied to the engine by means of the tubular body for the purified air. In this connection, filter mats or similar block-shaped filter elements are conventionally used and inserted into an appropriately designed filter housing. When in certain applications an increased filter efficiency is required, it is necessary to employ filter mats of correspondingly enlarged dimensions so that the size of the filter housing and thus of the entire filter pipeline is significantly increased. In the usual applications of filter pipelines in a motor vehicle, in lawn mowers or even in compressors, there is however only a very limited space available so that providing the required filter efficiency is often difficult or even excluded. Moreover, the manufacture of filter pipelines with increased filter area is complex and cost-intensive because expensive filter elements such as round filter elements or compact filter elements must be used.

It is an object of the present invention to design a filter pipeline in such a way that a filter area as large as possible in relation to the size of the filter pipeline is made available with a cost-effective manufacture of the filter pipeline.

SUMMARY OF THE INVENTION

This object is solved in accordance with the invention in that as a filter element a filter bag of a flexible material is provided that is attachable in the area of its opening to the tubular body.

According to the invention a filter bag of a flexible material is provided as a filter element which filter bag is attachable in the area of its opening to the inner side of the pipeline. The filter bag extends from its opening to its bag bottom in the longitudinal direction of the pipeline. In this way, the length of the pipeline can be utilized and, as needed, by employing a filter bag of an appropriate length, a filter area can be made available that optionally extends to the end of the pipeline. The filter bag of flexible material can be pushed also through bends of the filter pipeline so that even in inaccessible bend areas a filtration can be performed in a simple way.

Expediently, the filter bag and the inner wall of the tubular body are shaped such that in the circumferential direction of the pipeline different spacings between the filter bag and an inner wall of the tubular body are provided so that it is prevented that the filter bag rests against the inner wall of the tubular body and so that there remains always a clean air space between the tubular body and the filter bag. Preferably, the filter bag and the inner wall of the tubular body have different cross-sectional contours. The filter bag can be advantageously prevented from resting against the inner wall of the tubular body by ribs that project inwardly from the tubular body.

An inexpensive manufacture of the filter pipeline can be achieved by designing the filter bag and/or the tubular body with a polygonal cross-sectional contour. By means of the polygonal cross-sectional contour it is ensured that a plurality of projections are formed as a result of the respective cross-sectional contour against which the filter bag can rest selectively about the circumference of the tubular body. In this connection, a star-shaped cross-sectional contour of the filter bag and/or of the tubular body is particularly advantageous.

In a preferred embodiment the filter bag is provided with attachment means for attaching it to the filter pipeline so that the filter bag can be attached in a simple way during assembly of the filter pipeline in the interior of the tubular body. In this connection, a clip-on connection provides a particularly simple assembly when the filter bag in the area of its opening is provided with an annular element that surrounds the opening which annular element can be locked in a securing groove provided on the tubular body. In this connection, the annular element can be embodied as an elastic spring ring. Alternatively or additionally, the tubular body can be produced from an elastically expandable material at least in the area of the securing groove. The tubular body is expediently manufactured of a mixture of thermoplastic synthetic material and an elastic synthetic material wherein an inexpensive manufacture is possible by extrusion of synthetic material or extrusion blow molding. In this connection, the plastic tubular body can be shaped in a simple manufacturing process so as to have the required cross-sections. In this connection, a thermoplastic elastomer (TPE) is employed as an elastic synthetic material wherein the use of polyamide (PA) or in particular polypropylene (PP) is preferred. Polypropylene may be partially filled in this connection and, in particular, may contain a proportion of talcum.

By extrusion of synthetic material or extrusion blow molding, the tubular body can be produced in a simple way as a monolithic part so that a part is produced that can be easily handled and integrated with minimal assembly expenditure in the intake manifold. By means of employing in accordance with the invention a filter bag of flexible material, no cross-sectional enlargements are needed for the use of the filter element because the required filter area is achieved primarily by means of the length of the filter bag in the longitudinal direction of the filter pipeline. In this way, it is possible to produce inexpensively endless pipe systems without great cross-sectional jumps wherein high manufacturing speeds with uniform quality can be achieved.

The attachment of the filter bag is advantageously achieved by clamping its rim that surrounds the bag opening between two abutting tubular parts. For this purpose, on the inner wall of the filter pipeline no shaping for attachment means must be provided because the end sections that are present anyway for attachment of the pipes can be used for clamping the filter bag.

By using the flexible filter bag a section-wise design of the tubular body as a bellows with crease folds is particular advantageous wherein the tubular body as a result of the bellows present in these sections is bendable relative to its longitudinal direction and the bellows is adjustable to any possible directional change.

By arranging several filter bags sequentially, the filter efficiency can be effectively increased while requiring minimal space because the filter bags with their filter bottoms pass through the openings of the respectively filter bag arranged downstream and partially extend in the interior of the filter bag arranged downstream. In this connection, filter bags with different pore structures can be sequentially arranged in a simple way, for example, as a coarse filter and an adjoining fine filter. The filter bags are arranged at a spacing relative to one another in the longitudinal direction of the filter pipeline so that between the filter layers spaces for receiving the air that has just been filter will result. A simple and thus quick and inexpensive assembly is provided by attachment of the filter bags in a mounting part wherein the mounting part is inserted with the filter bags attached thereto into the pipeline. The mounting part itself is designed as a pipe and is connected to the adjoining end sections of tubular bodies, respectively. In this way, for maintenance of the filter pipeline at regular intervals the mounting part can be exchanged together with the filter bags with a few manipulations and new filter bags can be inserted.

The filter bag is comprised preferably of paper or nonwoven material. The flexible bag material is folded with minimal manufacturing expenditure into the cross-sectional contour desired for the filter bag.

BRIEF DESCRIPTION OF THE DRAWINGS

Embodiments of the invention will be explained in the following with the aid of the drawing in more detail. It is shown in.

DESCRIPTION OF PREFERRED EMBODIMENTS

Figure 1:
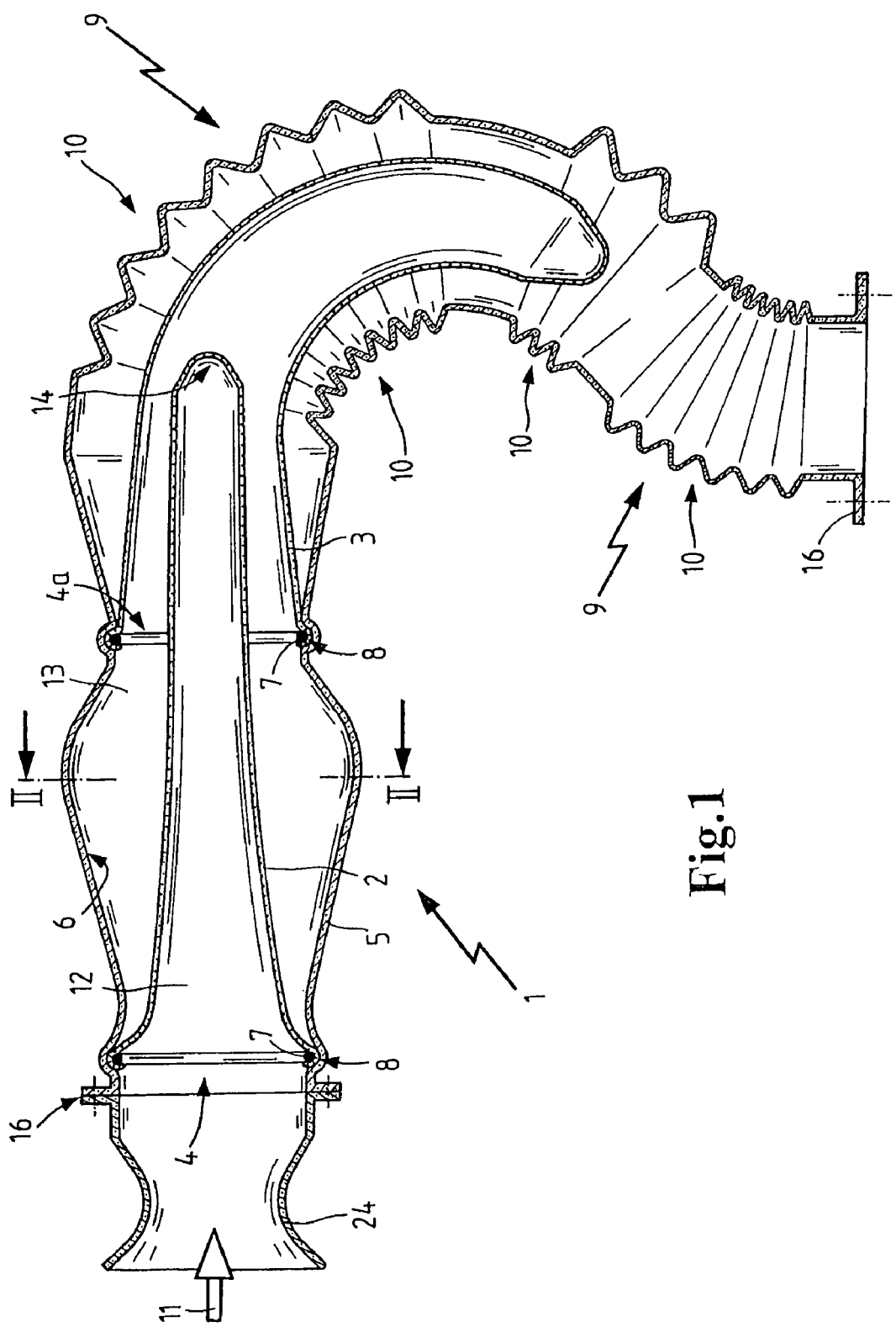
FIG. 1 a cross-section of a filter pipeline.

FIG. 1 shows the cross-section of a filter pipeline 1 for the intake manifold of an internal combustion engine, not illustrated, comprising a tubular body 5 that is produced continuously by extrusion blow molding. The tubular body 5 is designed as a monolithic part and is connected with the flanges 16 provided at its ends to tubular sockets 24 of the intake manifold or to the throttle.

The tubular body 5 has sections embodied with folds 10 or crease folds so that the tubular body is bendable in these sections 9. Taken-in air passes through the tubular body 5 in the longitudinal direction 11 wherein the incoming polluted air is guided through the filter bags 2, 3. The filter bags are comprised of nonwoven material, paper or other filtration media and are therefore flexible. In the present embodiment two filter bags 2, 3 are provided and spaced apart from one another in the longitudinal direction 11. The filter bags are attached with their rims in the area of opening 4 on the inner wall 6 of the tubular body 5. In the present embodiment a clip-on connection is provided wherein the filter bags 2, 3 in the area of their openings 4, 4a are provided with an annular spring element 7 that surrounds the opening 4, 4a which spring element may lock in the securing groove 8 formed on the tubular body 5. The securing grooves 8 are formed continuously about the circumference of the inner wall 6 of the tubular body 5 and extend transversely to the longitudinal direction 11 so that the opening 4, 4a of the filter bags 2, 3 provide the largest possible intake cross-section of the filter bags.

The filter bags 2, 3 extend in the longitudinal direction of the tubular body 5 and enclose in the direction toward their bag bottom a large interior space and form a very large filter area based on the bag length. By means of the bag length, without enlargement of the tubular cross-section, a larger filter area in the pipe direction can be provided for the combustion air passing through.

Even when the total length of all filter bags 2, 3 surpasses the length of the tubular body 5, several filter bags 2, 3 can be mounted in the pipeline 1 in that the filter bag 2 with its bag bottom 14 is pushed through the opening 4a of the filter bag 3 that follows in the longitudinal direction 11 and therefore extends partially in its interior. In this way, for the available length of the filter pipeline 1 an enlarged filter area can be provided by filter bags 2 that are inserted into one another. In this connection, filter bags are used that have a cross-section that tapers in the direction toward the filter bottom so that it is ensured that the filter bag 2 projecting into the filter bag 3 arranged downstream will not be in contact with said filter bag 3.

The filter bag comprised of flexible nonwoven material, paper or other filter material can be inserted in a simple way into the tubular body 5 and adapts to any possible bend of the tubular body 5 without this requiring additional deformation measures.

The polluted air that enters through the pipe socket 24 passes through the opening 4 into the interior of the filter bag 2 arranged upstream in the longitudinal direction 11 of the pipeline 5; the interior represents the polluted air side 12. The air is sucked through the filter material of the filter bag 2 from the polluted air chamber 12 into the purified air chamber 13 that is formed between the filter bag 2 and the tubular wall 6. The purified air chamber 13 of the first filter bag 2 forms at the same time the raw air side of the filter bag 3 arranged downstream in the longitudinal direction 11. In the illustrated arrangement the upstream filter bag in the longitudinal direction 11 can be used as a coarse filtration device with coarse filter material while the downstream filter 3 provided with appropriate fine pores is used as a fine filter. With such a stepped filtration, even for short pipeline length a complete filtration, even in case of a significant pollutant particle load, can be achieved by providing an appropriate length of the filter bags 2.

Figure 2:
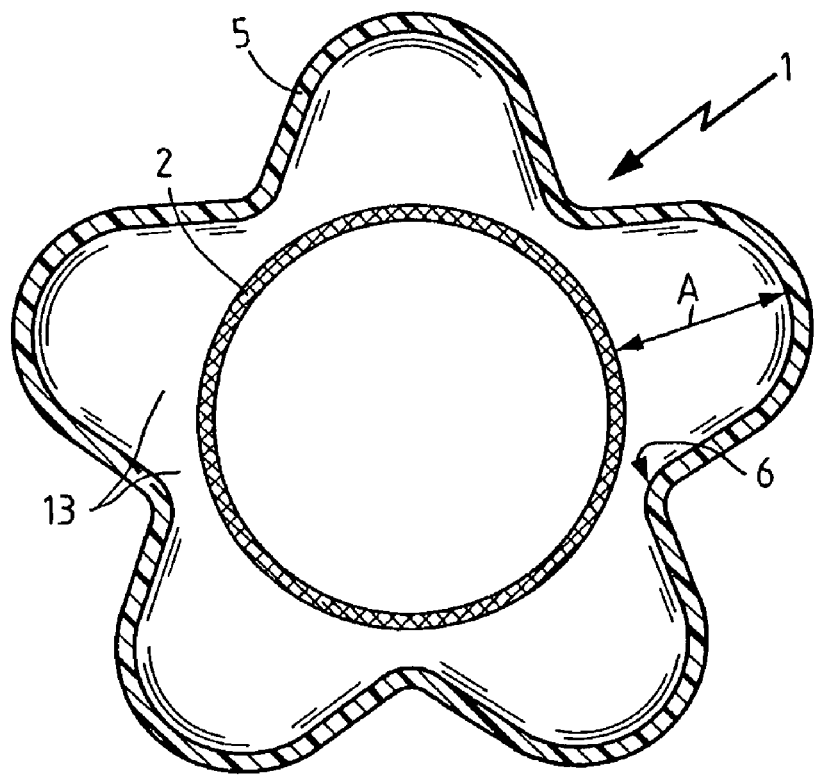
FIG. 2 a section of the filter pipeline according to II-II in FIG. 1.

FIG. 2 shows a cross-section of the filter pipeline in accordance with section line II-II of FIG. 1. The tubular body 5 and the filter bag 2 have different cross-sectional contours so that it is prevented that the filter bag will rest against the inner wall of the tubular body 5. In the present embodiment, a filter bag 2 with approximately circular cross-section is provided while the tubular body 5 has an approximately star-shaped cross-sectional contour. The cross-sectional contour of the tubular body 5 ensures that in the circumferential direction there are at all times different spacings A between the inner wall 6 and the filter bag 2 and, in this way, a pure air chamber 13 having a sufficiently large size is ensured.

Figure 3:
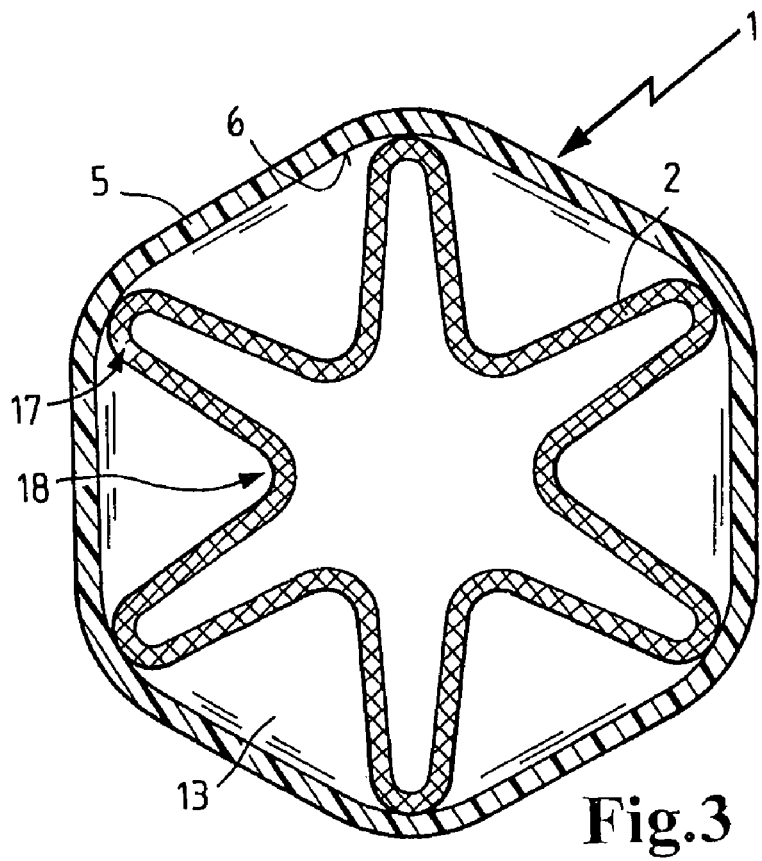
FIG. 3 a cross-section in accordance with section II-II with an alternative design of the filter pipeline.

FIG. 3 shows an alternative embodiment in which a filter bag 2 of polygonal or star-shaped cross-sectional contour is arranged in the tubular body 5. The filter bag 2 is arranged in loops by means of longitudinal folds 17, 18 so that the filter bag will rest selectively with the outwardly positioned folds 17 on the inner wall 6 of the tubular body 5 and the inwardly positioned folds 18 delimit the purified air chamber 13.

Figure 4:
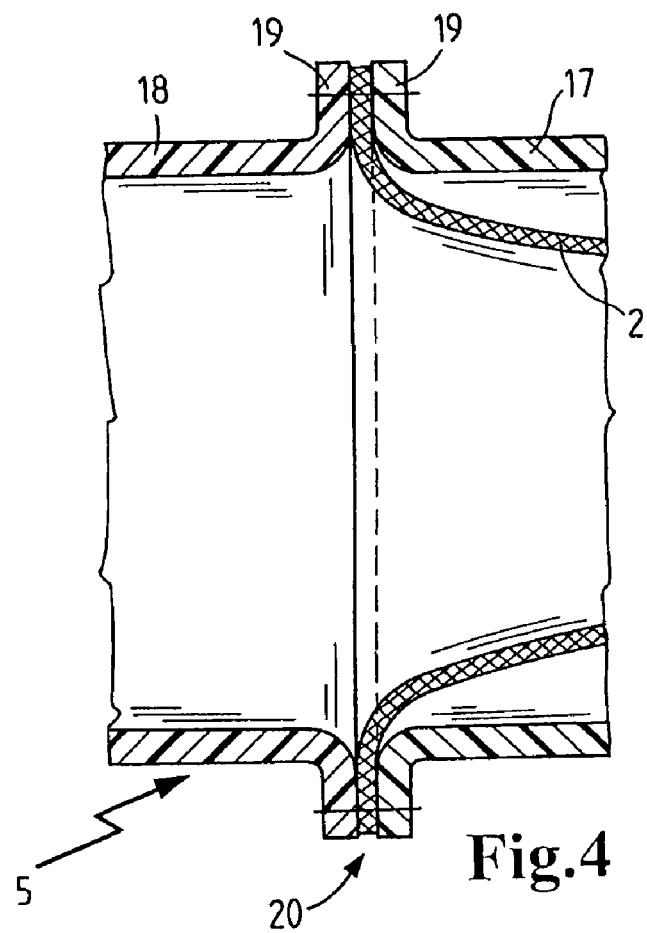
FIG. 4 an alternative design of the attachment of the filter bag.

FIG. 4 shows a simple attachment of the filter bag 2 in the tubular body 5; this is advantageous particularly for a multi-part configuration of the pipeline. In the multi-part embodiment two pipe parts 17, 18 that adjoin one another are provided at their end sections with flanges that are aligned congruently with one another and are attached to one another. Between the flange collar 19 of the joined pipe sections 17, 18 the circumferential rim 20 of the filter bag 2 is clamped in the area of its opening and in this way the filter bag 2 is secured on the tubular body 5.

Figure 5:
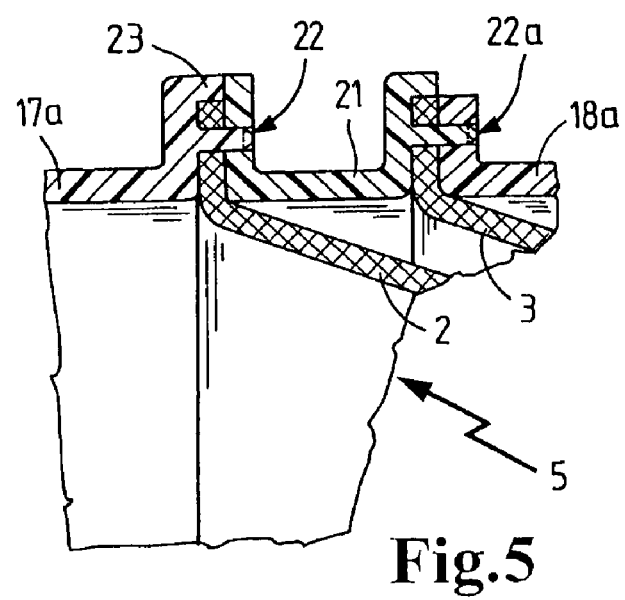
FIG. 5 a cross-section of an attachment of filter bags with a tubular mounting part.

FIG. 5 shows a cross-section of a filter pipeline with two filter bags 2, 3 that are spaced from one another in the longitudinal direction of the filter pipeline 5 and are attached on a tubular mounting part 21. The mounting part 21 has a contour matching that of the pipeline and is mounted between two adjacent pipe sections 17*a*, 18*a* of the pipeline 5. In this connection, the mounting part 21 is secured by means of bolts or similar fasting elements 22 on the back 23 of the adjoining pipe section 17*a*. The filter bag 3 as well as the pipe section 18*a* are secured on a bolt or fasting element 22*a* of the mounting part 21. For maintenance of the filter pipeline at regular intervals, the mounting part 21 with both filter bags 2, 3 attached thereto can be exchanged as needed and, in this way, both filter bags 2, 3 can be replaced with a few manipulations.

What is claimed is:

1. A filter pipeline for an internal combustion engine, the filter pipeline comprising:
   an air intake system having at least one pipe section conducting air flow for an internal combustion engine;
   a tubular body installed in said air intake system and connected said at least one pipe section;
   an elongated flexible filter bag closed at one end, an opposing end of said filter bag having a rim surrounding an opening into an interior of said filter bag, said filter bag arranged in the tubular body,
   wherein the filter bag is made of a flexible material that is removably and replaceably attached in the area of the rim to the tubular body,
   wherein the filter bag has attachment means and the filter bag is attached with the attachment means to the filter pipeline,
   wherein the filter bag has an annular element surrounding the opening and
   wherein the tubular body has a securing groove,
   wherein the annular element is locked by a clip-on connection in the securing groove.

2. The filter pipeline according to claim 1, wherein the filter bag and an inner wall of the tubular body are shaped such that in a circumferential direction of the pipeline different spacings are provided between the filter bag and the inner wall of the tubular body.

3. The filter pipeline according to claim 2, wherein the filter bag and the inner wall of the tubular body have different cross-sectional contours.

4. The filter pipeline according to claim 2, wherein the inner wall of the tubular body has projecting ribs arranged in a longitudinal direction of said tubular body, said ribs providing said different spacings.

5. The filter pipeline according to claim 1, wherein at least one of the filter bag and the tubular body has a polygonal cross-sectional contour.

6. The filter pipeline according to claim 5, wherein the polygonal contour is a star-shaped cross-sectional contour.

7. The filter pipeline according to claim 1, wherein the annular element is a spring ring which expands into said securing groove to lock said filter bag to said tubular body.

8. The filter pipeline according to claim 1, wherein the tubular body consists of an elastically expandable material at least in the area of the securing groove.

9. The filter pipeline according to claim 1, wherein the tubular body is a monolithic part.

10. A filter pipeline for an internal combustion engine, the filter pipeline comprising:
    an air intake system including two adjoining pipe sections conducting air flow for an internal combustion engine;
    a tubular body installed in said air intake system and connected to an end of said at least one pipe section;
    a exchangable filter including
       a tubular mounting part configured to mount between said two adjoining pipe sections of said air intake tract;
       a first elongated flexible filter element closed at one end and having a rim surrounding an opening into an interior of said flexible filter element at an opposing end, said rim of said first flexible filter element secured to said tubular mounting part;
       a second elongated flexible filter element closed at one end and having a rim surrounding an opening into an interior of said second flexible filter element at an opposing end, said rim of said second flexible filter element secured to said tubular mounting part;
       wherein said rim of said first filter element is spaced in a longitudinal direction of said tubular mounting part from said rim of said second filter element,
       wherein said second filter element is arranged downstream of said first filter element, said filter elements arranged to filter sequentially in series,
       wherein for maintenance, said exchangeable filter of said tubular mounting part having filter elements is replaceable as a unit.

11. The filter pipeline according to claim 10, wherein said first filter element passes through an interior of said rim of said second filter element, said first filter element extending at least partially into said interior of said second filter element.

12. The filter pipeline according to claim 1, wherein
    the tubular body has sections embodied as a bellows,
    wherein the bellows is bendable relative to a longitudinal direction of the tubular body.

13. The filter pipeline according to claim 11, wherein the bellows is comprised of crease folds.

14. The filter pipeline according to claim 1, wherein several of said filter bag are provided and said several filter bags are spaced apart from one another in a longitudinal direction of the tubular body.

15. The filter pipeline according to claim 14, wherein a first one of said several filter bags has a bag bottom that extends through the opening of a second one said several filter bags that is arranged downstream in the longitudinal direction of the tubular body.

16. The filter pipeline according to claim 15, wherein said second one of said several filter bags has finer filter pores than said first one of said several filter bags.

17. The filter pipeline according to claim 1, wherein the flexible material of the filter bag is selected from the group consisting of paper and nonwoven material.

18. The filter pipeline according to claim 1, wherein the flexible material is folded for providing a cross-sectional contour of the filter bag.

19. The filter pipeline according to claim 1, wherein
    the tubular body comprises two pipe parts and a tubular mounting part mounted between the two pipe parts,
    wherein several of the filter bag are attached to the mounting part.

20. The filter pipeline according to claim 1, wherein the tubular body is comprised of a mixture of a thermoplastic synthetic material and an elastic synthetic material.

21. The filter pipeline according to claim 1, wherein the tubular body or components of the tubular body are produced by extrusion of synthetic material or by blow molding.

22. The filter pipeline according to claim 4, wherein said tubular body has a polygonal cross-sectional contour providing said different spacings.

23. The filter pipeline according to claim 22, wherein the polygonal contour is a star-shaped cross-sectional contour.

24. The filter pipeline according to claim 7, wherein several of said filter bag are provided and said several filter bags are spaced apart from one another in a longitudinal direction of the tubular body,
wherein a first one of said several filter bags has a bag bottom that extends through the opening of a second one said several filter bags that is arranged downstream in the longitudinal direction of the tubular body.

* * * * *